B. J. N. MARDEN.
ASTRONOMICAL ROUTE FINDER.
APPLICATION FILED MAY 14, 1918.

1,325,877.

Patented Dec. 23, 1919.
2 SHEETS—SHEET 1.

INVENTOR:
Basil J. N. Marden
BY
ATTY.

UNITED STATES PATENT OFFICE.

BASIL JOCK NEWTON MARDEN, OF STODHAM PARK, ENGLAND.

ASTRONOMICAL ROUTE-FINDER.

1,325,877.          Specification of Letters Patent.      Patented Dec. 23, 1919.

Application filed May 14, 1918. Serial No. 234,455.

*To all whom it may concern:*

Be it known that I, BASIL JOCK NEWTON MARDEN, subject of the King of Great Britain, residing at Stodham Park, in the county of Hampshire, England, have invented a new or Improved Astronomical Route-Finder, of which the following is a specification.

This invention relates to an appliance the principal purpose of which is to enable the route through an unknown country or through the atmosphere, above the clouds for example, toward a known destination to be ascertained and guided by observation of the sun or either of the other celestial bodies, the moon or a selected star which is most conveniently in view during progress toward the desired objective.

The appliance consists of two parts:—

Figure 1:
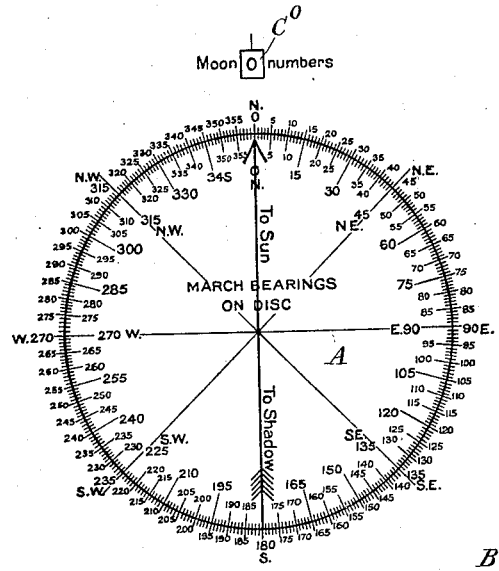

(1) The "compass" whereby the route is actually directed. This is illustrated in Figure 1 of the accompanying drawing, and:—

(2) An instrument for setting the "compass" so that it can be used for the desired purpose:—called the "azimuth finder".

Figures 2, 4, 5:
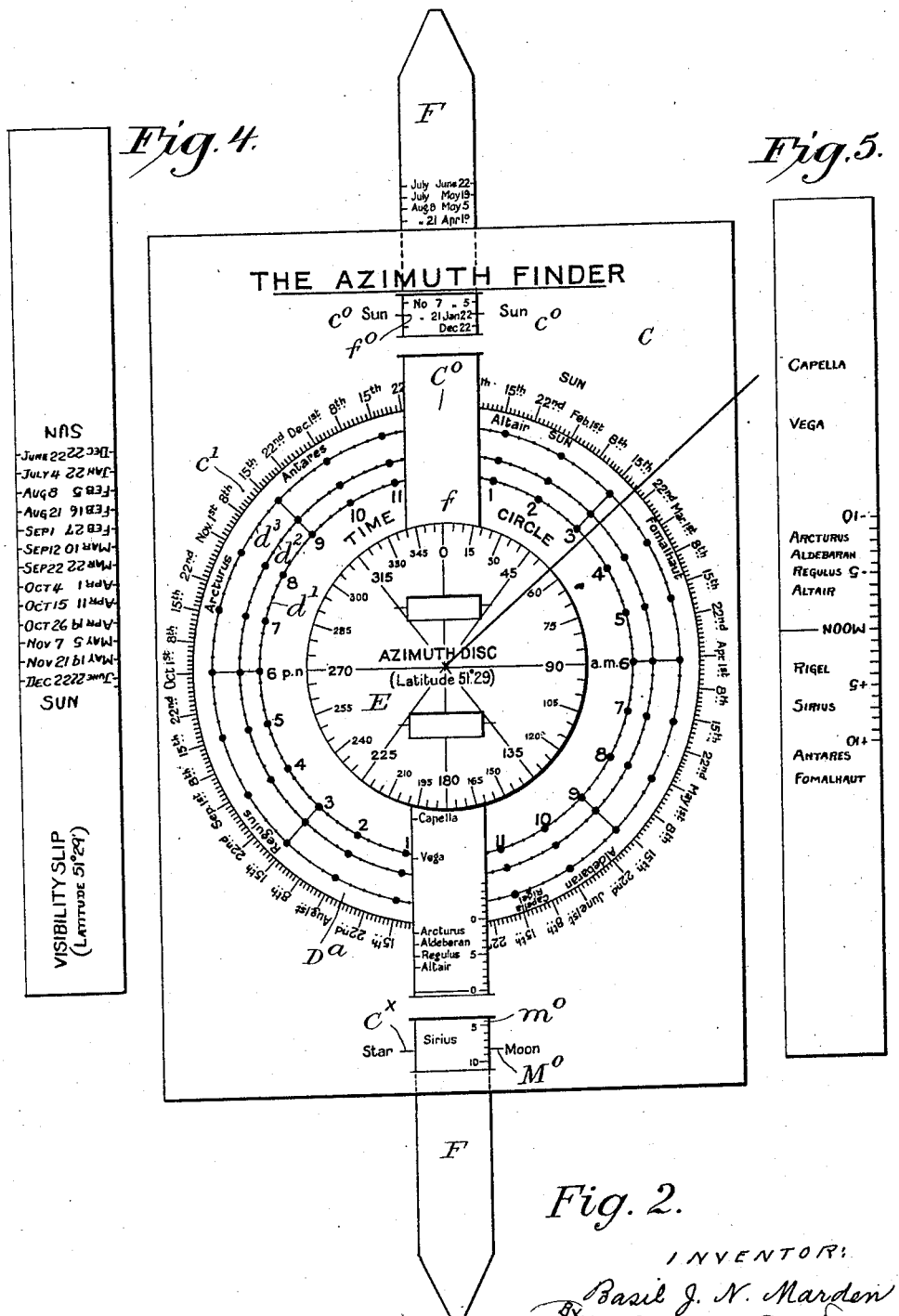

This is illustrated in Fig. 2.

Figure 3:
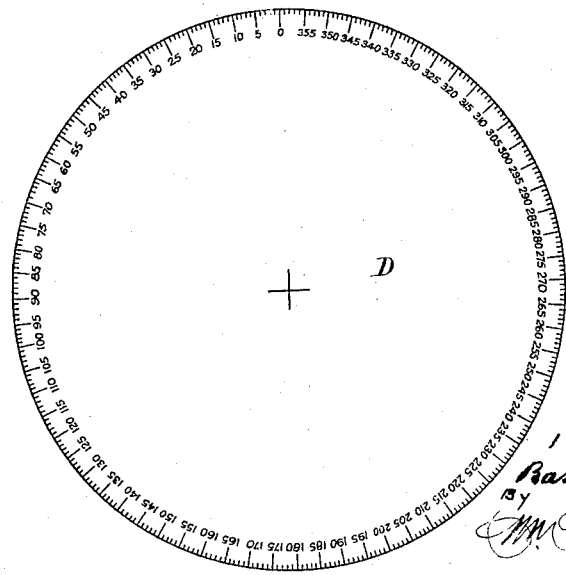

Fig. 3 shows a rear view of the azimuth finder.

For a further purpose, which will be described presently, so called "visibility strips" are required.

These are illustrated in Figs. 4–5 and are used in conjunction with the instrument shown in Fig. 2 for the purpose of ascertaining the beginning and end of the period of time during which a celestial body is above the horizon on any specified day.

Referring first to the "compass" shown in Fig. 1, A is a circular disk which at its center is rotatably mounted on a base-plate B. On both A and B, circles are depicted the circumferences of which are equally divided and the points of division numbered to correspond to 360° and lettered to correspond to the cardinal points of the compass. The diameter denoted 0°–180° or N—S on A is further depicted in a pronounced manner by an arrow the point of which is at 0°, N.

For the purpose of directing a route march through an unknown country or a flight guided by observation of the sun, for example, the azimuth of the sun at the instant of starting the march or flight is first ascertained by the instrument shown in Fig. 2 as will be presently described.

The division-mark of the compass-disk A which corresponds to the bearing of the desired objective is then brought into coincidence with the division mark on B which indicates the pre-ascertained azimuth of the sun at the instant it is desired to start the march or flight. With the arrow on the disk A thus positioned the "compass" A B is then oriented so that the arrow is caused to point at the sun.

The line marked N—S or numbered 0°–180° on the base-plate B will then show the direction to be taken toward the desired objective.

In the event of the sun being more or less exactly behind the observer who is directing the route and looking in the direction in which he is proceeding, the arrow on A can be kept pointing toward the sun by the device of erecting a rod at right angles to the disk A and situated at the arrow point so that, when the arrow points toward the sun, the shadow of the rod wil lie along the shaft of the arrow.

Referring now to Fig. 2 which shows the construction of the instrument called the "azimuth finder":—This consists of three relatively movable parts:—viz. C a base-plate on which is depicted a "date" circle $c^1$ whose circumference is divided into 365 equal parts to correspond to the number of days in a normal year, the divisions being named and numbered to correspond to the months and days of the month of the year:—

D a "time disk" which is so mounted on the base-plate C as to be rotatable about the center of the said "date" circle, the circumference being coincident with the circumference of the circle $c^1$. On D are depicted a plurality of concentric circles $d^1$ $d^2$ $d^3$, the circumference of each of which is divided into 24 equal parts with subdivisions which are so numbered that each point on the circumference of either circle called a "time-circle" will correspond to a particular instant of the day.

The radius of the time circle which is adopted for the purpose of this instrument is made proportional to the tangent of the angle of latitude of the place at which the instrument is intended to be used, being in fact made equal to that tangent multiplied by a constant $K^1$ whose numerical value depends on the scale adopted in the construction of the instrument.

Of the 3 time-circles shown in Fig. 2, the circle $d^1$ corresponds to the latitude of Paris, $d^2$ to the latitude of Greenwich and $d^3$ to the latitude of Edinburgh. The radius for any other latitude can be calculated and the subdivided corresponding time-circle readily depicted.

For the purpose of ascertaining the azimuth of any one of the well-known stars which may be chosen for the purpose of steering the required course, on the circumference of the time-disk positions are denoted and correspondingly named which signify the instant of the day at which on the 1st of January the said star crosses the meridian:—

The third component of the azimuth finder is a so-called "azimuth-disk" E. This circular disk which, for purposes of accuracy, is made as large as possible, while avoiding the liability to obscure the divisions of the time-circles, is so mounted that its center can be traversed along the diameter of the date-circle which intersects the circumference thereof at the point $c^0$ which corresponds to the moment between the end of one year and the beginning of the next.

The circumference of the azimuth-disk E is graduated into 360 divisions which, instead of being equal, differ therefrom in a manner that would result if equal divisions of the circumference of a circle situated in the equatorial plane were projected on to a plane inclined thereto at an angle of $\frac{11}{2} - \lambda$ where $\lambda$ is the angle of latitude at the place of observation i. e. the position from which the proposed route or flight is intended to start. Accordingly the graduation of the circumference of the azimuth disk is such as to allow for the projection on a horizontal plane of the apparent motion of a celestial body around the zenith. The divisions in the neighborhood of those numbered 0 and 180, which are on the diameter of traverse of the center of the azimuth disk, are therefore equal to one another and smaller than those numbered 90 and 270 in the proportion of sin $\lambda$ to unity.

To make use of this instrument to ascertain the sun's zenith at the instant it is intended to start the proposed route or flight, the time-disk D is rotated into such a position that the point on its circumference corresponding to 12 o'clock coincides with the point $c^0$ of the date-circle $c^1$ on the base-plate C and the azimuth-disk E is displaced from its central situation to a position which depends on the date of the day of the year on which the proposed route or flight is intended to take place. (The method of determining this position will presently be explained.)

In such a position of the azimuth-disk a line drawn from the center of the disk to the point on the time circle corresponding to the instant of time at which it is intended to start, will cross the circumference of the azimuth-disk at a point the graduation number of which expresses the degrees of azimuth of the sun at that time and place.

The point of intersection with the circumference of the azimuth-disk of the above-mentioned line can be conveniently ascertained by the provision of a black-thread secured at one end to the center of the azimuth-disk. If this thread is drawn tightly to the point of the time-circle corresponding to the time of starting the route of flight, the degree of azimuth of the sun will be indicated at the point at which the thread intersects the circumference of the azimuth-disk.

To enable the azimuth of the sun to be ascertained as above described, it will be requisite to displace the center of the azimuth disk from the center of the time-disk to a point which is distant therefrom by an amount equal to the tangent of the declination of the sun at the time of observation multiplied by the before-mentioned constant $K^1$. The magnitudes of the required displacements corresponding to each of a series of dates are calculated, the declination angles being ascertained by reference to the *Nautical Almanac* and the magnitudes of the several displacements are plotted off on the borders of the strip F which serves as the carrier of the azimuth-disk as indicated at $f$ in Fig. 2, the line $f^0$ on the strip corresponding to a zero displacement, which line is set to register with a datum line $C^0$ $C^0$ on the base-plate C when the center of the azimuth-disk E coincides with the center of the time-disk D.

If circumstances require that the projected route or flight be directed by observation of a star which is more or less approximately in front of the proposed direction of progress, the azimuth of such a star at the moment of starting is ascertained by means of the azimuth-finder Fig. 2 in the following manner:—

The time-disk D is rotated into the angular-position in which the point on its circumference indicated by the name of the star which has been selected as the guiding star, registers with the division on the circle $c^1$ which corresponds to the date of the proposed night-march or flight and the azimuth-disk E is displaced to a position such that a mark on the strip F which bears the name of the selected guiding star registers with a datum-line $C^x$ on the base-plate C, provided for use with star observations, then by means of the black-thread, before referred to, the point of intersection with the circumference of the azimuth-disk E of a line drawn from the center of E to the point of the time-circle corresponding to the instant at which it is proposed to start the march or flight is ascertained. The position of this point expressed in degrees will be the azimuth of the star whereby the compass will be required to be set for the proposed march or flight.

As in the case of the sun to ascertain the azimuth, the disk E must be displaced from its central position a distance equal to $K^1$ times the tangent of the angle of declination of the celestial body and since for any one star the declination is invariable so, unlike the case of the sun, one point only on the carrier strip F for each star serves to fix the correct position of the disk E for the purpose of ascertaining the azimuth of that star.

The determination of the azimuth of the moon at the instant of starting the proposed march or flight is somewhat more involved but can be effected with the aid of the azimuth finder as follows:—

The angular position of the time-disk D on the base-plate C is set to accord with the date and time of the proposed march or flight by the employment of what are called "meridian-passage-moon-numbers" which are depicted in the time-disk D.

Also the correct position of the azimuth-disk is set in accordance with so-called "declination-moon-numbers".

These latter numbers represent distances of the center of the azimuth-disk E from its central position equal to $K^1$ times the tangent of the declination angle of the moon at 12 o'clock on the night of the proposed march or flight. These distances are calculated from information derived from the *Nautical Almanac* and the numbers corresponding thereto are set out on the following table—

| Date. | Declination moon numbers. | Meridian passage moon numbers. |
|---|---|---|
| 1st Oct., 1919 | −9 | 84 |
| 2nd Oct., 1919 | −8 | 96 |
| 3rd Oct., 1919 | −7 | 108 |
| 4th Oct., 1919 | −5 | 120 |
| 5th Oct., 1919 | −3 | 131 |
| 6th Oct., 1919 | −2 | 143 |
| 7th Oct., 1919 | 0 | 156 |
| 8th Oct., 1919 | +3 | 168 |
| 9th Oct., 1919 | +5 | 181 |
| 10th Oct., 1919 | +6 | 195 | which represents a sample of the information requisite for the complete use of the appliance of the present invention. These distances are plotted on a border of the carrier strip F as at $m^o$, the line through this point corresponding to and when set to register with the datum line $M^o$ on the base-plate C defining the central position of the disk E.

Each of the above referred-to meridian-passage-moon-numbers is in degrees equal to $\pi$ + the hour angle, the hour angle being that of the moon at 12 o'clock at midnight on the corresponding date.

The meridian-passage-moon-numbers are determined for midnight at the end of each date.

For every two hours after midnight add 1: for every two hours before midnight subtract 1.

For example on October 9th, 1919 at 4.45 a. m. the number is 170 being 168+2.

For the sake of simplicity in the construction and use of the azimuth-finder the meridian - passage - moon - numbers are depicted on the back of the time-disk D at a radial distance corresponding to an aperture formed in the base-plate C through which the said numbers are viewed from the reverse side of the plate C.

In Fig. 3 is shown the rear face of the time-disk D. The aperture for viewing the moon numbers and setting the position of the disk to accord with the date and clock-time of the proposed march or flight being located at $C^o$ corresponding to the point $C^o$ on the face of the plate C.

By means of what is called a visibility strip of which an example is shown in Figs. 4–5 when applied to the azimuth-finder of Fig. 2 it will be possible to ascertain on any date the hour at which either of the celestial bodies will rise above and sink below the horizon.

The strip illustrated in Figs. 4–5 corresponds to the latitude 51° 29′ of Greenwich the front face of the strip as shown in Fig. 4 referring to the rising and setting of the sun while the reverse face of the same strip shown in Fig. 5 gives corresponding information for the stars and the moon.

The length of the strip is made equal to the height of the base-plate C of Fig. 2 so that when it is applied to Fig. 2 and the top and bottom edges of the strip kept coincident with the top and bottom edges of the plate C the center of the strip will also coincide with the horizontal center line of Fig. 2.

The edges of the strip as shown in Fig. 4 are graduated to correspond to the graduations $f$ marked on the borders of the before-mentioned strip F which carries the azimuth-disk E, the actual distance of any graduation mark being equal to the distance of the corresponding mark on F from its center multiplied by the square of the tangent of the angle of latitude.

The time disk D is adjusted in the same manner as in taking an azimuth reading.

The times of rising of the sun are read in the right-hand half of the azimuth finder, the times of setting being read on the left-hand half.

In ascertaining the visibility of the moon the reading to be adopted upon the scale is that corresponding with the declination moon numbers before mentioned.

I claim:

1. An instrument whereby the azimuth of the sun or other celestial body can be ascertained, comprising a base-plate on which is depicted a date-circle, a time, disk rotatably mounted coincident with the date circle, the circumference of the time-disk being so equally divided as to denote a point corresponding to each instant of the 24 hours of a day and an azimuth-disk so mounted that its center can be traversed along a diameter of the date circle which intersects the circumference of the date circle at the point between the last day of the year and the first day of the next, the circumference of the said azimuth-disk being graduated in a manner which would result if equal divisions of the circumference of a circle, situated in the equatorial plane, were projected on to a plane inclined thereto at an angle equal to the complement of the angle of latitude at the place of observation.

2. An instrument as embodied in claim 1, and a visibility strip associated therewith for determining the instant of rising or setting of a celestial body.

3. In an instrument according to claim 1, for ascertaining the azimuth of the sun on any given date, a series of graduations whereby the azimuth-disk can be set to correspond with the declination angle of the sun at the time of observation.

4. In an instrument according to claim 1, means for ascertaining the azimuth of a star consisting of a graduation of the circumference of the time disk and graduations for the setting of the azimuth-disk substantially as described.

5. For use with an instrument according to claim 1, means for ascertaining the azimuth of the moon consisting of a table of meridian-passage-moon-numbers and a table of declination moon-numbers for setting the position of the azimuth disk substantially as described.

In testimony whereof I have signed my name to this specification.

BASIL JOCK NEWTON MARDEN.